United States Patent [19]
Gast

[11] Patent Number: 5,803,408
[45] Date of Patent: Sep. 8, 1998

[54] AUTOPILOT/FLIGHT DIRECTOR STALL PROTECTION SYSTEM

[75] Inventor: Mark E. Gast, Seabrook, Tex.

[73] Assignee: The Boeing Company, Seattle, Wash.

[21] Appl. No.: 441,683

[22] Filed: May 15, 1995

[51] Int. Cl.$^6$ ................................................ B64C 13/16
[52] U.S. Cl. ........................... 244/178; 244/181; 701/14; 340/966
[58] Field of Search .................................. 244/178, 181, 244/182, 188; 318/584; 340/966; 701/6, 9, 14

[56] References Cited

U.S. PATENT DOCUMENTS

| | | | |
|---|---|---|---|
| 4,027,839 | 6/1977 | Quinlivan | 340/996 |
| 4,044,975 | 8/1977 | Blecher et al. | 244/181 |
| 5,136,518 | 8/1992 | Glover | 244/181 |

*Primary Examiner*—Galen L. Barefoot
*Attorney, Agent, or Firm*—Seed and Berry LLP

[57] ABSTRACT

In an aircraft under autopilot control, a stall protection system overrides established autopilot parameters in response to a monitored angle of attack for the aircraft exceeding a trigger angle of attack. The trigger angle of attack is established with reference to a stick shaker angle of attack for the aircraft. When the aircraft exceeds the trigger angle of attack, the stall protection system produces an error signal causing the autopilot to seek an angle of attack 1 degree below the stick shaker angle of attack. Initially, the stall protection system provides a boost command to the error signal to accelerate the response of the aircraft to the error signal. The boost command is produced by a driving signal generator that selects one of four driving signals in response to monitored flap angle and impact pressure.

17 Claims, 6 Drawing Sheets

| $I_1$ | $L_1$ | OUT |
|---|---|---|
| 1 | 1 | 1 |
| X | 0 | 0 |

AUTOPILOT/FLIGHT DIRECTOR STALL PROTECTION SYSTEM

TECHNICAL FIELD

The present invention relates to aircraft flight control systems, and more particularly, to a stall protection system for autopilots and flight directors.

BACKGROUND OF THE INVENTION

Aircraft flight control systems allow a pilot to control the orientation of an aircraft in three axes, namely yaw, pitch, and roll. The pitch axis extends along the wingspan of the aircraft, the roll axis extends along the length of the aircraft, and the yaw axis is perpendicular to both the pitch axis and the roll axis. The orientation of the aircraft about the yaw axis is controlled by foot pedals which deflect the aircraft's rudder from side to side. The orientation of the aircraft about the pitch axis is generally controlled by pushing or pulling on the control yoke to deflect the aircraft's elevator down or up, respectively. Finally, the orientation of the aircraft about the roll axis is generally controlled by rotating the control wheel in either direction to differentially deflect ailerons on the aircraft's wing.

In addition to being manipulated by the pilot, an aircraft's flight controls can also be controlled automatically by autopilots and yaw dampers. Autopilots manipulate the aircraft's ailerons to control the direction of flight in order to follow a heading or course set by the pilot. Autopilots also manipulate the aircraft's elevator to control the altitude of the aircraft in an "altitude hold" mode, or to control the rate of climb or descent of the aircraft in a vertical speed (vertical feet/second) or vertical profile or vertical navigation (vertical feet/mile). Yaw dampers manipulate the rudder to limit yawing of the aircraft in turbulence. The above-described autopilot modes are usually combined so that the autopilot is controlling simultaneously both the ailerons and the elevator. The autopilot may also combine modes for the same axis, such as when the "altitude capture" mode is selected. In the altitude capture mode, the autopilot operates in the vertical speed or vertical navigation mode to control the rate of descent or climb until a preset altitude is reached. The autopilot then automatically switches to the altitude hold mode to maintain the aircraft at the preset altitude.

Although aircraft flight controls can be controlled either manually or automatically, there is also a semi-automatic mode of operation using a flight director. A flight director receives command signal from the autopilot that would be used to control the aircraft flight controls. However, instead of actually controlling the flight controls, the command signals control the position of a flight director bar on the pilot's attitude indicator to tell the pilot how to manipulate the flight controls so that the airplane flies according to the preset flight profile. Thus, for example, the flight director tells the pilot to lower or raise the nose of the aircraft by pushing or pulling on the yoke so that the aircraft achieves a preset rate of climb or is maintained at a preset altitude. Similarly, the flight director tells the pilot to bank the airplane by rotating the control wheel so that the aircraft is turned to a desired heading.

For a given flight condition, the airspeed may be highly dependent upon several flight parameters, including the amount of thrust delivered by the engines. However, the autopilot typically does not control the thrust. Instead, the applied thrust is selected by the pilot. For this reason, the autopilot, or the pilot following the flight director's commands, may inadvertently cause the airplane to fly at a speed at which the airplane stalls when the autopilot or the flight director is set to a new mode or the aircraft's flight conditions change.

The "angle of attack" of an aircraft wing is the angle between the chord of the wing (a line from the leading edge to the trailing edge) and the angle of incidence, i.e., the angle of the wing's flight path. For a given airspeed, the lift created by an aircraft wing increases with an increasing angle of attack. However, at some point the angle of attack becomes so great that the airflow no longer conforms to the surface of the wing, thereby destroying lift in a condition known as a "stall". While a stall can occur at any speed, it normally occurs when the aircraft is flying slowly near the ground just after lift off or just prior to landing. In these flight conditions, the aircraft's angle of attack is generally large as is required to generate substantial lift at low airspeeds. Thus, most stalls occur near the ground where there is little room for stall recovery. It is therefore very important to safety to prevent the aircraft from stalling, particularly just after takeoff or prior to landing when the aircraft is near the ground.

To address these concerns, aircraft have employed lift detectors and angle of attack sensors triggering warning systems to provide an audible warning to the pilot that a stall is imminent. These stall warning systems also employ a mechanical actuator to shake the control yoke when a stall is imminent thereby providing the pilot with a tactile stall warning. These later stall warning systems are known as "stick shakers" and the angle of attack at which the stick shaker actuates is known as the "stick shaker angle of attack". All of these conventional stall warning devices have relied upon the pilot to take some positive action, such as increasing the thrust or decreasing pitch, to reduce the angle of attack below that at which the wing will stall. While these devices are highly effective while the pilot is flying the airplane an thus paying careful attention to the aircraft's flight, they may not be as satisfactory where the autopilot is flying the aircraft or the pilot is flying according to flight director commands generated by the autopilot. For example, the autopilot may be switched from a vertical speed mode in which the aircraft is descending to an altitude hold mode in which the aircraft is maintained in level flight. The thrust applied to descend at a given airspeed is significantly less than the thrust needed to fly in level flight at that same airspeed. Thus, if the thrust remains constant, the aircraft will fly at a lower airspeed after the autopilot or flight director is switched from the vertical speed mode to the altitude hold mode. In some cases, the decreased speed may cause the aircraft to stall. If the pilot does not increase the thrust or take some other action, such as changing the selected flight condition or mode, the aircraft could actually stall and descend into the ground before corrective action could be taken.

The danger of a stall is perhaps greater when the aircraft is being controlled by the autopilot than it is when the pilot is hand flying the aircraft. When the autopilot if flying, the pilot may be too preoccupied or distracted by other tasks to notice the stall warning, thus precluding the pilot from taking corrective action. In fact, the pilot may have enabled the autopilot for the express purpose of allowing him or her to concentrate on other duties, such as navigation or dealing with mechanical difficulties, thus making it even more likely that a stall warning will go unnoticed.

SUMMARY OF THE INVENTION

A stall protection system and method overrides pilot selected autopilot commands in the event that the autopilot commands result in a flight condition that is likely to cause the aircraft to stall. The stall protection system first selects a nominal maximum allowable angle of attack. A trigger angle of attack above the nominal maximum allowable angle of attack is also selected. The actual angle of attack of the aircraft is monitored and compared to the selected target angle of attack by comparing corresponding electrical signals. If the actual angle of attack of the aircraft exceeds the trigger angle of attack, first and second stall signals are produced. The first stall signal is an unfiltered stall signal and the second signal is an augmented, filtered signal. The first and second stall signals are input to an electronic flight controller to override the established set of flight control parameters with a revised set of flight control parameters. The revised set of flight control parameters correspond to and angle of attack below the nominal maximum allowable angle of attack for the aircraft. The first and second stall control signals may be boosted by a transient boost command that causes the aircraft to temporarily seek an angle of attack below the revised angle of attack such that the aircraft's initial response is more rapid.

The boost command is produced as a function of a monitored impact pressure on a Pilot-tube type of airspeed monitor and in response to a monitored flap angle. A forward position switch selects one of four constants to produce a driving signal that is filtered to produce the boost command.

Because the angle of attack corresponding to a stall condition may vary according to flight conditions, the nominal maximum angle of attack is selected with respect to the stick shaker angle. In one embodiment, the trigger angle of attack is 1 degree above the stick shaker angle of attack and the revised angle of attack is 1 degree below the stick shaker angle of attack.

DETAILED DESCRIPTION OF THE INVENTION

Figure 1:
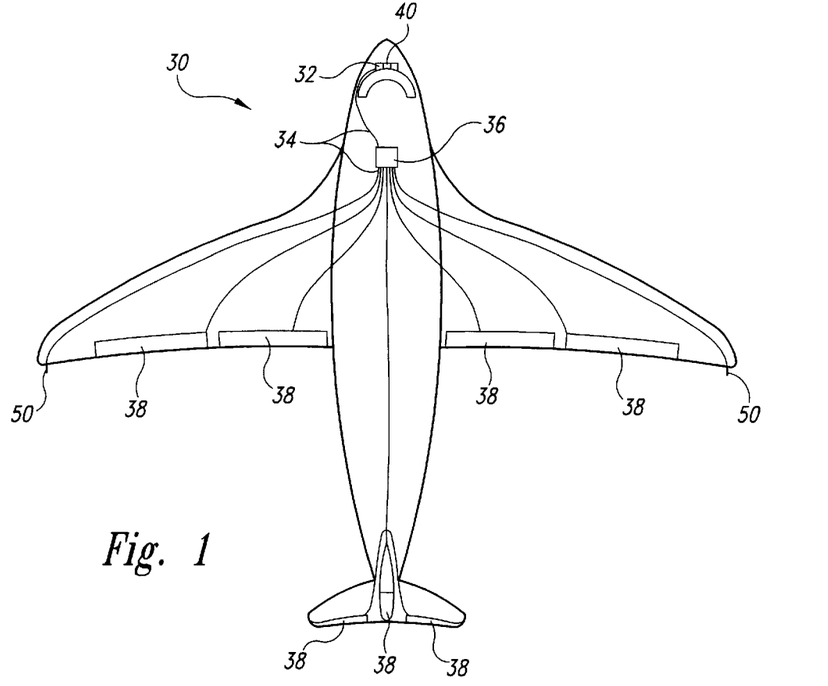
FIG. 1 is a plan view of a representative aircraft including stall protection system, autopilot/flight director, and flight control system.

As shown in FIG. 1, an aircraft 30 operates under control of an autopilot 32. The autopilot 32 is coupled through a control bus 34 to flight control system 36 of the aircraft 30 which operates the flight control surfaces 38, such as the flaps, ailerons, elevators and rudder. In the preferred embodiment, the autopilot 32 is one of three autopilots (the master autopilot and two slave autopilots) operating cooperatively with each other. Each of the autopilots 32 includes a stall protection system 40, as will be described below. Except as discussed below with respect to FIGS. 8 and 9, each of the three autopilots 32 and its respective stall protection system 40 operates identically, and only one will be described. The three autopilots 32 operate in one of two operational modes, either triple-independent mode or master/slave mode. The autopilots 32 will be referred to herein according to the master and slave designations regardless of their actual operational mode. For example, although the voting procedure described with respect to FIG. 9 occurs in triple independent mode, the signals and autopilots 32 are designated by master and slave-based terminology.

Figure 2:
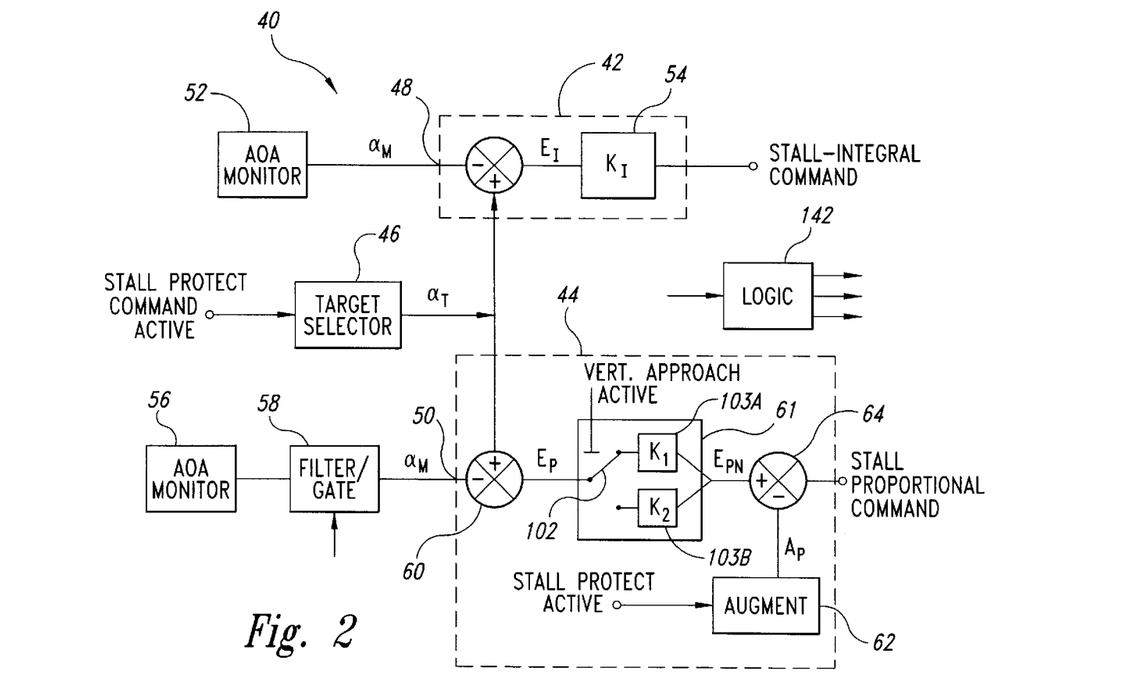
FIG. 2 is a block diagram representation of a stall protection system having proportional and integral stall command outputs.

The stall protection system 40, shown in greater detail in FIG. 2, includes a stall integral command generator 42 and a stall proportional command generator 44, driven by a target selector 46 and a respective monitored angle of attack signal $\alpha_M$ at a respective signal input 48, 50 from respective angle of attack monitors 52, 56. The stall proportional command generator 42 produces a stall proportional command that is input to a proportional command input of the autopilot 32. Similarly, the stall integral command generator 44 produces a stall integral command that is input to an integral command input of the autopilot 32. The autopilot 32 accepts the stall integral and proportional commands and controls the flight systems in response through a control bus 34.

As will be described hereinafter, the stall proportional command and the stall integral command are weighted error signals corresponding to the differences between the monitored angle of attack $\alpha_M$ and a target angle of attack $\alpha_T$. Based upon the stall proportional and integral commands, the autopilot 32 adjusts the flight control systems, preferably the elevator, to alter the flight profile to minimize the differences between the monitored angle of attack $\alpha_M$ and the target angle of attack $\alpha_T$ and thereby reduce the magnitude of the error signals. The target angle of attack $\alpha_T$ is selected by the target selector 46, as described hereinafter with respect to FIG. 3. The stall protection system 40 also includes a logic circuit 142 which generates various command signals, such as a Stall Protect Command, based on operating modes selected by the pilot and signals received from the autopilot 32. The logic circuit 142 is described in detail with reference to FIGS. 8 and 9.

One skilled in the art will recognize that, unless otherwise indicated by the context, air speeds and other flight conditions (e.g., angle of attack, air speed, and impact pressure) can be represented by digital words when the stall protection system is implemented by digital computer or by corresponding electrical signals when the stall protection system is implemented in whole or in part by an analog system. For clarity of presentation, the electrical signals will be referred to herein by their physical correspondents.

With further reference to FIG. 2, the stall integral command generator 42 receives the target angle of attack $\alpha_T$ from the target selector 46 and subtracts a voltage corresponding to the monitored angle of attack $\alpha_M$ from a first angle of attack monitor 52 to produce an integral error signal $E_I$. The integral error signal $E_I$ is normalized by a constant $K_I$ in constant block 54 to produce the stall integral command.

The stall proportional command generator 44 operates in a similar fashion by comparing the target angle of attack $\alpha_T$ to the monitored angle of attack $\alpha_M$ from a second angle of attack monitor 56 after filtering by a filter/gate 58 at an adder 60. The output of the adder 60 is a proportional error signal $E_P$. The proportional error signal $E_P$ is multiplied by one of two constants $K_1$ or $K_2$ in a dual-constant block 61 to produce a normalized proportional error signal $E_{PN}$. The normalized proportional error signal $E_{PN}$ is then augmented by an augmentation signal $A_P$ from an augmentation circuit 62 at an adder 64 to produce the stall proportional command.

Figure 3:
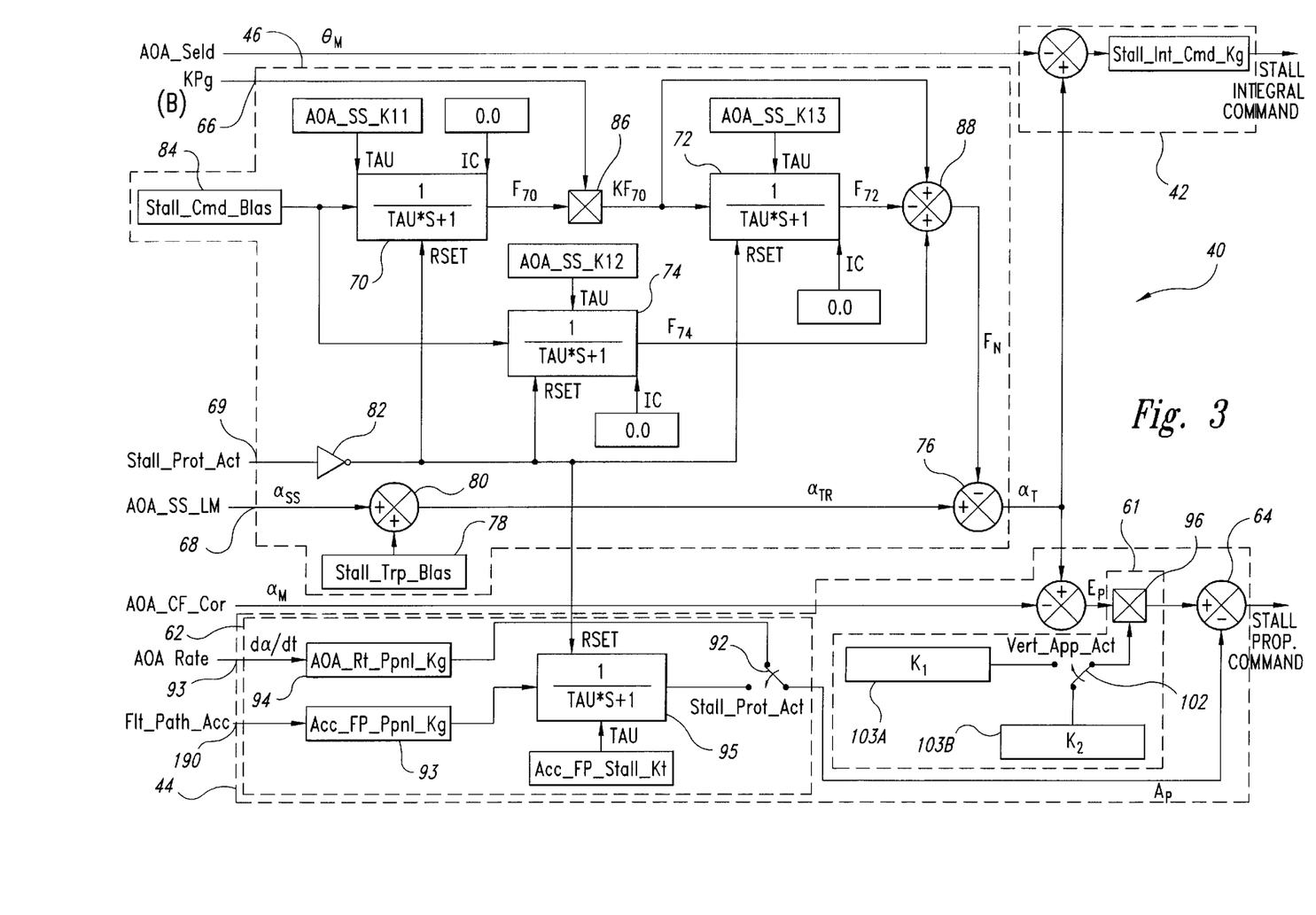
FIG. 3 is a detailed block diagram of the stall protection system of FIG. 2.

The target selector 46, dual-constant block 61 and augmentation circuit 62 are shown in greater detail in FIG. 3. The target selector 46, which selects the target angle of attack $\alpha_T$, has two signal inputs 66, 68 and a control input 69. The first signal input receives an angle of attack-based driving function KPg. The driving function KPg is a varying function dependent upon flap position and a monitored impact pressure $Q_C$. The development of the driving function KPg will be described hereinafter with respect to FIGS. 5, 6 and 7.

Returning to FIG. 3, within the target selector 46, the driving function KPg is used to vary the gain of a filter network including first, second and third filter/gates 70, 72, 74 to produce a command boost signal $F_N$ for input to a command adder 76. At the command adder 76, the command boost $F_N$ is subtracted from a trigger angle of attack $\alpha_{TR}$ formed as the combination at an adder 80 of a filtered stick-shaker angle of attack $\alpha_{SS}$ from the signal input 68 and a trip bias 78.

The development of the boost command $F_N$ is best explained in conjunction with FIGS. 3 and 4A–4E. The network of filter/gates 70, 72, 74 is activated by an inverter 82 under control of the Stall Protect Command from the logic controller 142 at the control input 69. When the Stall Protect Command is inactive (low) as shown in the left-band portion of FIG. 4A, the inverter 82 sets each of the reset inputs to the filter/gates 70, 72, 74 high. The output signals $F_{70}$, $F_{72}$ and $F_{74}$ from of the filter/gates 70, 72, 74, respectively, are "0" as long as the Stall Protect Command is inactive. When the Stall Protect Command goes active, the filter/gates 70, 72, 74 are no longer held in reset by the inverter 82, instead operating as low-pass filters.

Figure 4A:
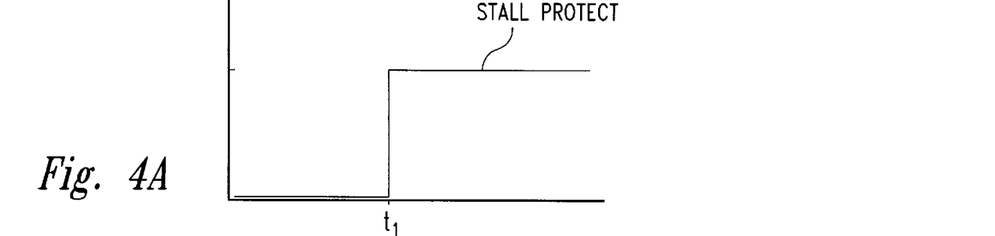
FIG. 4A is a waveform diagram showing a stall protect signal going active.
Figure 4B:
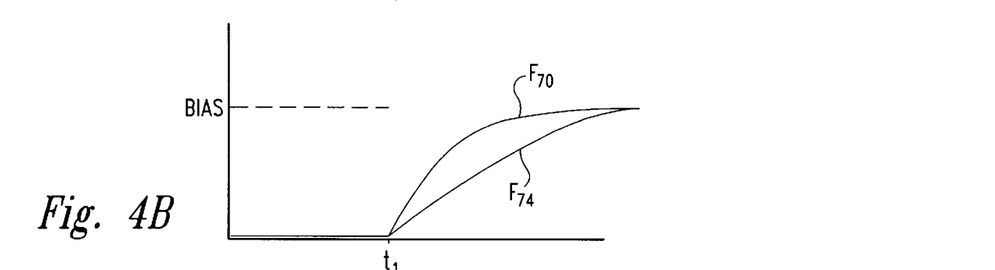
FIG. 4B is a waveform showing outputs of filters within the stall protection system of FIG. 3 in response to the stall protect signal of FIG. 4A.
Figure 4C:
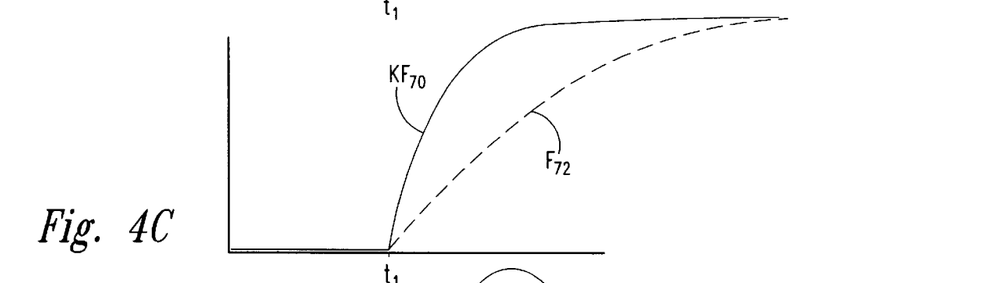
FIG. 4C is a waveform showing outputs of a multiplier and a filter within the stall protection system of FIG. 3 in response to the stall protect signal of FIG. 4A.
Figure 4D:
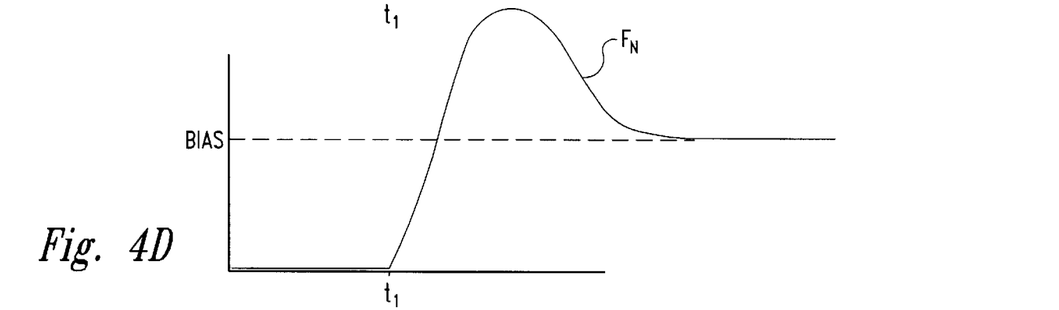
FIG. 4D is a waveform showing a boost command within the stall protection system of FIG. 3 in response to the stall protect signal of FIG. 4A.

When the Stall Protect Command goes active, the first and third filters 70, 74 accept a command bias input 84 that is a constant level driving signal and produce filtered outputs $F_{70}$, $F_{74}$ as shown in FIG. 4B. The signal $F_{70}$ output from the filter/gate 70 is then multiplied at a multiplier 86 by the driving function KPg to produce, at the output of the multiplier 86, a signal $KF_{70}$ as shown in FIG. 4C. The signal $KF_{70}$ from the multiplier 86 is then filtered by the second filter/gate 72 to produce an output signal $F_{72}$ that rises more slowly than the signal $KF_{70}$, as also shown in FIG. 4C. At an adder 88, the signal $KF_{70}$ is added to the output signal $F_{74}$ from the filter/gate 74 and the output signal $F_{72}$ from the filter/gate 72 is subtracted to produce the boost command $F_N$, as shown in FIG. 4D.

The signal $KF_{70}$ rises more quickly than the output $F_{72}$ from filter/gate 72. As a result, the signal $KF_{70}$ will initially overwhelm the output $F_{72}$, providing a large boost to the output $F_{74}$ from filter 74, causing an initial peak in the boost command $F_N$. As can be seen in FIG. 4D, the output $F_{72}$ from the filter/gate 72 eventually begins to "catch up" with the signal $KF_{70}$.

Because the output of the filter/gate $F_{72}$ is a low-pass filtered version of the signal $KF_{70}$ and is subtracted from the signal $KF_{70}$, the net effect of these two signals $F_{72}$, $KF_{70}$ at the adder 88 will eventually be zero. Consequently, after the initial peak, the output of the adder 88 will approach the value of the signal $F_{74}$ from filter/gate 74. Because the filter/gate 74 has no gain, the boost command $F_N$ will, after sufficient time, equal the command bias 84, as shown in FIG. 4D.

At the adder 76, the boost command $F_N$ is subtracted from the output of the adder 80, which is a combination of a trip bias 78 with the filtered stick shaker angle of attack $\alpha_{SS}$ at the signal input 68, to produce the selected target angle $\alpha_T$. The filtered stick shaker angle of attack $\alpha_{SS}$ is a conventionally derived signal supplied externally to the stall protection system 40 and indicates that the aircraft 30 is approaching a stall condition. The trip bias 78 corresponds to a 1 degree margin above the stick shaker angle of attack $\alpha_{SS}$ at which the stall protection will be triggered. The output of the adder 80 is thus a trigger angle of attack $\alpha_{TR}$ that is equal to the stick shaker angle of attack $\alpha_{SS}$ plus 1 degree, as shown in the left-hand portion of FIG. 4E. Because the stick shaker angle of attack $\alpha_{SS}$ varies depending upon the flight parameters, such as the flap and elevator angles and the air speed, the actual value of the trigger angle of attack $\alpha_{TR}$ will vary correspondingly.

Figure 4E:
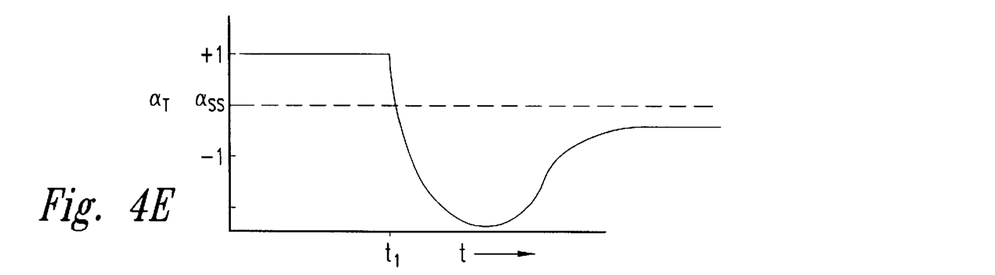
FIG. 4E is a waveform diagram of a selected angle of attack as output from a target selector within the stall protection system of FIG. 3 in response to the stall protect signal of FIG. 4A.

The target angle of attack $\alpha_T$ at the output of the adder 76 is the combination of the trigger angle of attack $\alpha_{TR}$ and the boost command $F_N$, as shown in FIG. 4E. Because the boost command $F_N$ depends upon whether or not the Stall Protect Command is active, as described above, the target angle of attack $\alpha_T$ will also depend upon whether the Stall Protect Command is active. As seen in FIG. 4E, when the Stall Protect Command goes active, the boost command $F_N$ of FIG. 4D is subtracted from the trigger angle of attack $\alpha_{TR}$, thereby driving the target angle of attack $\alpha_T$ well below the stick shaker angle of attack $\alpha_{SS}$. As the effect of the filter/gate 72 begins to negate the effect of the signal $KF_{70}$ and the boost command $F_N$ approaches the command bias 84, the target angle of attack $\alpha_T$ begins to approach the trigger angle of attack $\alpha_{TR}$ minus the command bias 84. Because the command bias 84 is selected to correspond to 2 degrees, the target angle of attack $\alpha_T$ will settle to the stick shaker angle of attack $\alpha_{SS}$ minus 1 degree ($\alpha_T=\alpha_{TR}-2=(\alpha_{SS}+1)-2$).

Because the boost command $F_N$ provides an initial boost to drive the target angle of attack $\alpha_T$ well below the stick shaker angle of attack $\alpha_{SS}$, the response of the control systems 36 of the aircraft 30 will initially be exaggerated, such that the initial response of the aircraft 30 toward the new target angle of attack $\alpha_T$ will be accelerated. By the time the aircraft 30 approaches the target angle of attack $\alpha_T$, the boost command $F_N$ will have decayed and the aircraft 30 will not be driven significantly past the new target angle of attack $\alpha_T$, which is the stick shaker angle of attack $\alpha_{SS}$ minus 1 degree.

Also shown in FIG. 3 is the structure of the augmentation circuit 62 within the proportional command signal generator 44. The augmentation circuit 62 provides one of two discrete augmentation signals at the adder 64 depending upon whether or not the Stall Protect Command is active. If the Stall Protect Command is active, the augmentation circuit 62 transfers a filtered version of a flight path acceleration signal from an input 90 as normalized by a constant 93 and filtered by a filter/gate 95 to the adder 64. If the Stall Protect Command becomes not active, a switch 92 within the augmentation circuit 62 couples a signal corresponding to an estimated rate of change of angle of attack $d\alpha/dt$ from a second input 93 to the adder 64. The estimated rate of change of angle of attack rate $d\alpha/dt$ is a signal available from the autopilot 32 and is normalized within the augmentation circuit 62 by a constant Kg at a constant block 94.

FIG. 3 also shows how the dual-constant block 61 within the proportional command signal generator 44 is realized with a multiplier 96 receiving one of two constants $K_1$ or $K_2$ from respective constant blocks 103A and 103B depending upon the position of a switch 102. The switch 102 is activated under control of a Vertical Approach Command from the autopilot 32 and supplies the first constant $K_1$ when the aircraft 30 is in a vertical approach mode and supplies the second constant $K_2$ when the aircraft 30 is in a cruise mode.

As described above with respect to FIG. 3, the boost command $F_N$ depends upon the value of the driving function KPg supplied at the signal input 66. The driving function KPg is derived from an impact pressure $Q_c$ by the driving signal generator 104 of FIG. 5. The driving signal generator 104 selects one of four signals with a four input select switch 106, where the switch position is controlled by a monitored flap position at a control input 108. Starting from a first input 109A at the bottom of the select switch 106, the select switch 106 receives, for flap angles at least 25 degrees, a constant $K_{25}$. At a second input 109B, the select switch 106 receives a constant $K_{5-20}$ corresponding to flap angles between 5 and 20 degrees. At the third input 109C, the select switch receives a variable $K_1$ corresponding to a flap angle of 1 degree.

Figure 6:
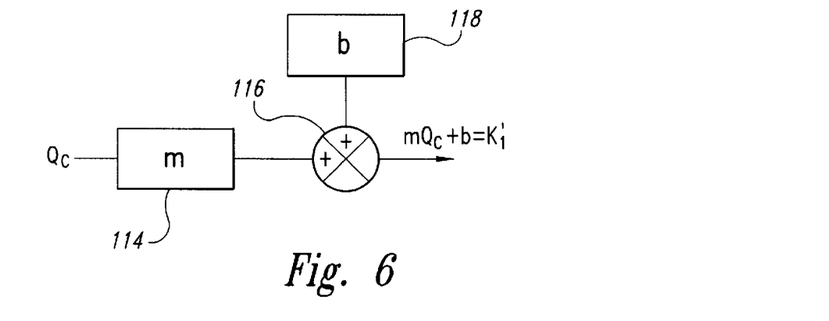
FIG. 6 is a detailed block diagram of a slope-intersect circuit of the block diagram of FIG. 5.
Figure 7A:
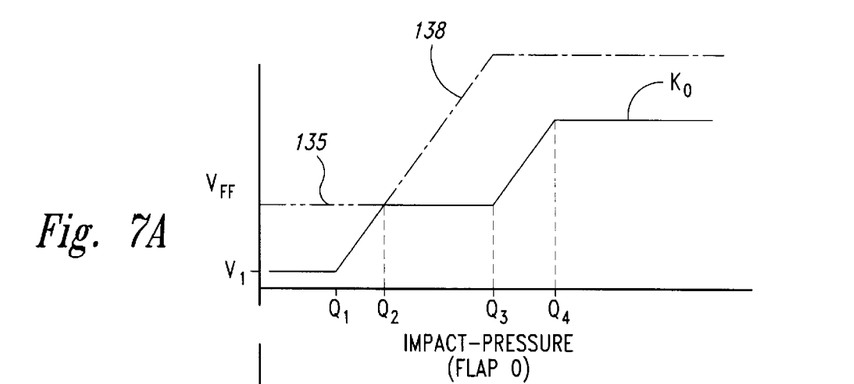
FIG. 7A is a graph of forcing function gain versus impact pressure for a flap angle of 0 degree.
Figure 7B:
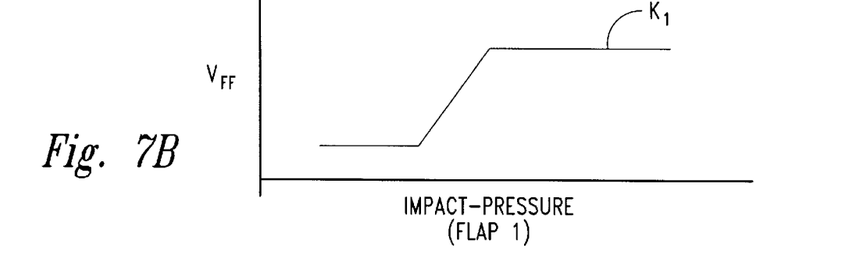
FIG. 7B is a graph of forcing function gain versus impact pressure for a flap angle of 1 degree.

The variable $K_1$ is a minimum- and maximum-limited, linear function of the impact pressure $Q_c$ produced by a slope-intercept block 110 and a limiter 112. The slope intercept block 112 is shown in greater detail in FIG. 6 and includes a constant gain m at a gain multiplier 114 receiving as its input the impact pressure $Q_c$. The output of the gain multiplier 114 is added at an adder 116 to a constant b from a y-intercept block 118 to produce a net output from the adder 116 of $K'_1$ equal to $m*Q_c+b$. Returning to FIG. 5, the output $K'_1$ from the slope-intercept block 110 is input to the limiter 112 to produce the minimum and maximum-limited variable $K_1$, as shown in FIG. 7A.

Figure 5:
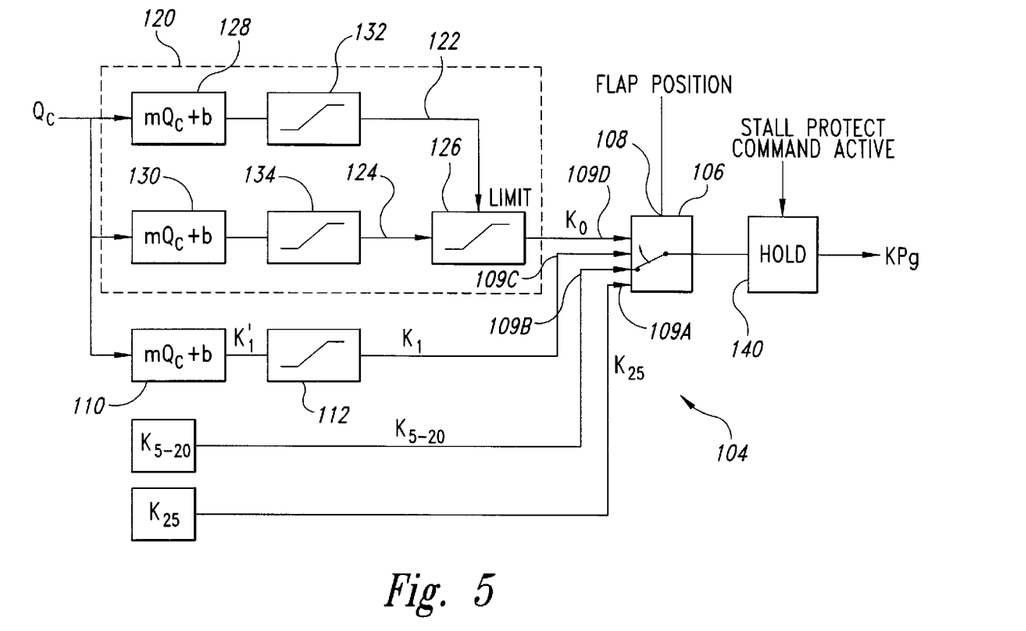
FIG. 5 is a block diagram of a forcing function gain circuit having an impact pressure input and a flap position input.

The fourth input 109D to the select switch 106 is a variable $K_0$ provided by a $K_0$ block 120 having two arms 122, 124 coupled to an output limiter 126. The upper arm 122 is coupled to a limit input of the output limiter 126 and provides the maximum limit for the output limiter 126. The lower arm 124 provides the signal input to the output limiter 126. Each arm 122, 124 includes a respective slope-intercept blocks 128, 130 identical in structure to the slope intercept block of FIG. 6; however, the respective slopes m- and y-intercepts b may differ. Also, each arm 122, 124 includes a respective input limiter 132, 134. The operation of the Ko block 120 is best described with reference to the diagram in FIG. 7A.

In the diagram, the solid line represents the output of the output limiter 126. At an impact pressure $Q_C$ below a selected minimum impact pressure $Q_1$, the output signal from the second input limiter 134 is limited to a first level $V_1$. In this impact pressure range, the output of the second input limiter 134 is below the output of the first input limiter 132 (lower limit of first input limiter 132 represented by broken line 135) such that the output limiter 126 passes the output of the second input limiter 134 unchanged.

Above the impact pressure $Q_1$, the output of the slope-intercept block 130 is greater than the minimum limit from the second input limiter 134 and the output of the second input limiter 134 begins to increase correspondingly. At this point, the output of the second input limiter 134 is still beneath the maximum limit of the output limiter 126 (as provided by the first input limiter 132) and the signal from the second input limiter 134 passes unchanged through the output limiter 126.

When the impact pressure $Q_C$ reaches the lower limit of the first input limiter 132 (which is the upper limit of the output limiter 126), the output limiter 126 limits its output signal $K_O$ to the maximum limit established by the lower limit of the first input limiter 132. The output from the second input limiter 134 continues to rise, as indicated by the modified broken line 138 of FIG. 7A. However, the output of the output limiter 126 remains constant until the input to the first input limiter 132, driven by the slope-intercept block 128, begins to rise at impact pressure $Q_3$. Above the impact pressure $Q_3$, the output of the first input limiter 132 (and thus the maximum limit of the output limiter 126) begins to rise until an impact pressure $Q_4$ is reached. The maximum limit of the output limiter 126, and thus the output $K_O$, rises correspondingly. Above the impact pressure $Q_4$, the upper limit of the first input limiter 132 is reached. The first input limiter 132 then provides a constant output level as the upper limit of the output limiter 126 such that the output $K_O$ of the output limiter 126 is fixed. The net effect of the limiter structures is the "slanted staircase" graph of FIG. 7A.

Whichever of the variables $K_0$, $K_1$ or constants $K_{5-20}$ or $K_{25}$ is selected by the select switch 106, it is input to a hold block 140 activated by the Stall Protect Command. The hold block 140 holds the value of the signal output from the select switch 106 at the time the Stall Protect Command goes active and continues to provide that value as the driving function KPg to the target selector 46. The driving function KPg, and thus the amount of boost provided by the boost command $F_N$ is thus dependent upon the impact pressure $Q_c$ and the flap position.

Figure 8:
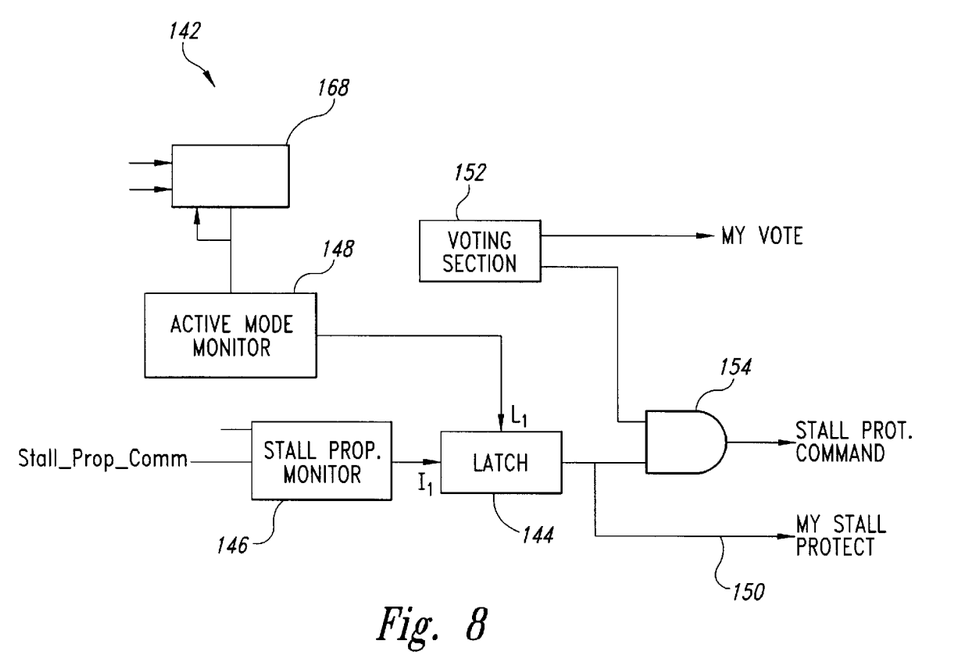
FIG. 8 is a logic diagram of a logic controller within the stall protection system of FIG. 1.

As described above, the stall protection system 40 is activated by the Stall Protect Command going active as produced by the logic circuit 142 shown in FIG. 8. The determination of whether the Stall Protect Command should be active or inactive is initially made at a latch 144 in response to signals from a stall proportional monitor 146 and an active mode monitor 148. The output of the latch 144 presents a determination by the logic circuit 142 that the stall protect system 40 should go active, as indicated by the signal MY Stall Protect at an output 150. For the Stall Protect Command to go active, the MY Stall Protect signal must be confirmed by a voting section 152 at an AND gate 154.

Figure 9:
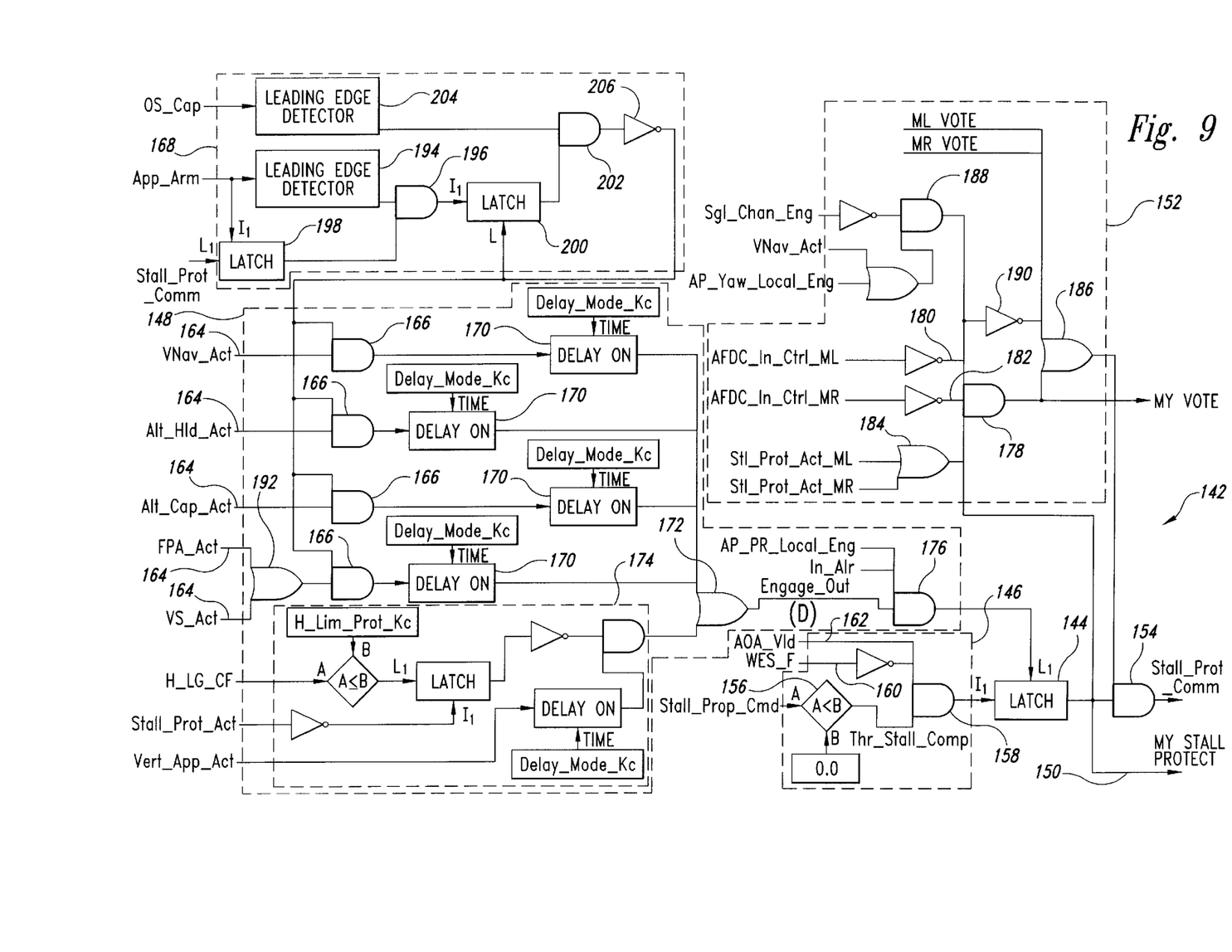
FIG. 9 is a detailed logic diagram of the logic controller of FIG. 8.

The block diagram of FIG. 8 is presented in greater detail in FIG. 9. The stall proportional monitor 146 is a comparator that receives the Stall Proportional Command from the adder 64 (FIG. 3) and determines if the Stall Proportional Command is less than 0. If the Stall Proportional Command is less than 0 at the comparator 156 (i.e., the monitored angle of attack $\alpha_M$ is greater than the target angle of attack $\alpha_T$), the comparator 156 outputs a "1." An AND gate 158 receives the output from the comparator 156 and confirms that the warning electronic system at an input 160 is not in fail mode and that the Angle of Attack Command at an input 162 is valid. If the Angle of Attack Command is valid, the warning electronic system is not in fail mode and the monitored angle of attack $\alpha_M$ is greater than the target angle of attack $\alpha_T$, the AND gate 158 outputs a "1" to an input $I_1$ of the latch 144.

Figure 10:
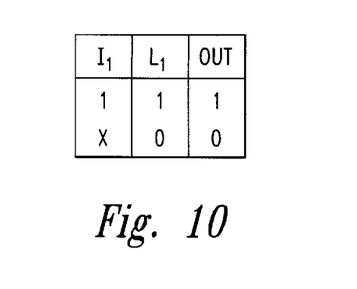
FIG. 10 is a logic table for a latch circuit within the stall protection system of FIG. 2.

As can be seen by the logic table of FIG. 10, a "1" at the input $I_1$ enables the latch 144. If the latch input $L_1$ is also a "1," the latch 144 will output a "1." The latch output will remain a "1" until the latch input $L_1$ is set to a "0."

The latch input $L_1$ is provided by the active mode monitor 148. The active mode monitor 148 produces a "1" if any one of a selected group of autopilot modes is active. In the preferred embodiment, the selected autopilot modes are vertical speed, flight path angle, altitude capture, altitude hold, and vertical navigation. The active mode monitor 148 may also produce a "1" if the selected mode is vertical approach, as described below with respect to the vertical approach section 174.

If any one of the selected modes is active, a "1" is provided at a respective input 164 of the active mode monitor 148. The signals from the respective inputs 164 are gated through respective AND gates 166 enabled by a glideslope capture circuit 168, as described hereinafter, coupled to the remaining inputs of the AND gates 166. The outputs of the AND gates 166 are coupled through respective delay ON blocks 170 to a common OR gate 172. An additional input to the OR gate 172 is coupled to an output of a vertical approach section 174. The vertical approach section 174 provides a "1" if vertical approach is active, the radio altimeter altitude is above a specified altitude, such as 200 ft., and the Stall Protect Command is active.

The output of the OR gate 172 confirms that at least one of the selected modes is active or the vertical approach conditions are satisfied. The active mode monitor 148 then confirms that the local autopilot 32 is engaged and the aircraft 30 is in the air by producing the logical AND of an autopilot engaged signal, an in-air signal and the output of the OR gate 172 at an AND gate 176. If the local autopilot 32 is engaged, the aircraft 30 is in the air and either one of the selected modes is active or the vertical approach conditions are satisfied, the AND gate 176 provides a "1" to the latch input $L_1$ of the latch 144. There, if the stall proportional monitor 146 determines that the monitored angle of attack $\alpha_M$ is greater than the target angle of attack $\alpha_T$, the latch 144 outputs a "1" that forms the MY Stall Protect signal. As discussed above, the MY Stall Protect signal is combined at the AND gate 154 with the output of the voting section 152 to produce the Stall Protect Command.

The voting section 152 ensures that the stall protection system 40 associated with the master autopilot 32 and at least one of the stall protection systems 40 associated with a slave autopilot 32 have determined that the Stall Protect Command should be active so long as only a single autopilot is active and the autopilot is in either vertical navigation mode or the local autopilot yaw control is engaged. If more than a single autopilot is active, the autopilot is not in vertical navigation mode or the local autopilot yaw control is not engaged, the voting section 152 will output a "1."

The determination of whether the stall protection system 40 is associated with the master autopilot 32 is made by an AND gate 178 that receives, at two of its input terminals 180, 182, a master Not-ML signal and a master Not-MR signal. The master Not-ML signal is the logical inverse of a signal from the left adjacent ("My Left") autopilot 32 indicating that the left adjacent autopilot 32 is, or is not, the master. The input terminal 182 receives the logical inverse of the corresponding signal from the right adjacent ("My Right") autopilot 32. It can be seen that both the left and right adjacent autopilots 32 must be slaves if the AND gate 178 is to output a "1." This situation will occur only if the present stall protection system 40 is associated with the master autopilot 32.

In addition to requiring that the stall protection system 40 be associated with the master autopilot 32, the AND gate 178 also requires that the ML Stall Protect signal or the MR Stall Protect signal, each of which is input to an OR gate 184, must confirm the MY Stall Protect signal. The MR and ML Stall Protect signals are from the left adjacent and right adjacent autopilots 32, and are generated within their corresponding stall protection systems 40 as their respective MY Stall Protect signals.

An output OR gate 186 ensures that the Stall Protect Command from the stall protection system 40 associated with the slave autopilots 32 will be a "1" whenever the stall protection system 40 associated with the master autopilot 32 so dictates by a voting procedure. The output OR gate 186 receives the MY Vote output from the AND gate 178 within the present stall protection system 40 and receives the ML Vote and MR Vote from the adjacent stall protection systems 40. If the adjacent stall protection systems 40 are slaves, their votes will be "0," as discussed above with respect to the terminals 180, 182. If, however, the present stall protection system 40 is associated with a slave autopilot 32, either the ML Vote or MR Vote will be from the stall protection system 40 associated with the master autopilot 32. Regardless of whether the master autopilot 32 is the left or right adjacent autopilot 32, the master autopilot's stall protection system signal will "vote" at the output OR gate 186 and produce a "1" at the output of the output OR gate 186. Consequently, both slave autopilots 32 will also output a "1" at their respective output OR gates 186.

A further condition to the MY Vote signal being a "1" is imposed at the remaining input of the AND gate 178. The condition comes from a limiting AND gate 188 that provides a "1" to the AND gate 178 only when multiple autopilots are engaged and the autopilot is in either vertical navigation mode or the local autopilot 32 is in yaw mode. If only a single channel is engaged or if the local autopilot 32 is not in either of vertical navigation mode or yaw mode, the limiting AND gate 188 outputs a "0." The "0" disables the AND gate 178 and sets the MY Vote low. Even though the MY Vote is low, the Stall Protect Command can go active because the "0" output from the limiting AND ate 188 is inverted by an inverter 190 to provide a "1" to the output OR gate 186.

From the above description, it can be seen that the stall protection system 40 will select a target angle of attack $\alpha_T$ dependent upon whether or not the Stall Protect Command is active. During normal operation of the aircraft 30, the Stall Protect Command is inactive and the target angle of attack $\alpha_T$ will equal the stick shaker angle of the attack $\alpha_{SS}$ plus 1 degree (the trigger angle of attack $\alpha_{TR}$). If, however, the comparator 156 determines that the Stall Proportional Command exceeds the trigger angle of attack $\alpha_{TR}$ (stick shaker angle of attack $\alpha_{SS}$ plus 1 degree), the Stall Protect Command will go active, initiating the signal responses described above with respect to FIGS. 4A–E. The target angle of attack $\alpha_T$ will then become the stick shaker angle of attack $\alpha_{SS}$ minus 1 degree. If the pilot takes no action, the autopilot 32 will, in response to the Stall Proportional Command and Stall Integral Command, direct the flight control systems 36 such that the aircraft 30 will seek to operate at an angle of attack equal to the lowered target angle of attack $\alpha_T$ (stick shaker angle of attack $\alpha_{SS}$ minus 1 degree).

As can also be seen from the above description, the pilot may cause the stall protection system 40 to exit the stall protect mode by disengaging the autopilot 32 or landing the airplane 30 such that the output of the AND gate 176 goes low to cause the Stall Protect Command to go inactive.

To allow the pilot to exit stall protect mode without disengaging the autopilot 32, the logic circuit 142 provides a "transient" state in response to selection of a new mode for the autopilot 32. In particular, the delay ON blocks 170 cause the active mode monitor 148 to produce a "transient 0" in response to selection of a new active mode. An example of a mode switch demonstrates the development of the "transient 0."

If, initially, the altitude capture mode is active, the output of the third delay ON block 170 will be a "1." If the active mode is switched from altitude capture to vertical navigation, the output of the third delay ON block 170 will go low immediately, as no delay is imposed upon a transition from ON to OFF. The input to the first delay ON block 170 (vertical navigation) will also go high immediately; however, its output will not go high in response to the selection of vertical navigation mode until after a selected delay period $\tau$. The output of all of the delay ON blocks 170 will temporarily be low until the output of the first delay ON block 170 goes high at the end of the delay period $\tau$. Consequently, the output of the OR gate 172 and thus the latch input $L_1$ will go low for a brief delay period $\tau$ after the new active mode is selected. In response, the latch 144 will return to the "0" logic state until the conditions above (monitored angle of attack $\alpha_M$ exceeding stick shaker angle of attack $\alpha_{SS}$ plus 1 degree, autopilot engaged, and aircraft in air) are satisfied. Thus, to exit stall protection mode, the pilot may simply switch between selected modes.

The approach of switching between modes will not work in the unique case where the pilot switches between vertical speed mode and flight path angle mode, due to the inclusion of an OR gate 192 before the fourth delay ON block 170. The OR gate 192 links both the vertical speed mode input 164 and the flight path angle mode input 164 to the same delay ON block 170, such that the active mode monitor 148 does not recognize a switch between vertical speed mode and flight path angle mode as a pilot action terminating stall protection.

In addition to the pilot taking some action to cause the stall protection system 40 to exit stall protection mode, the glideslope capture circuit 168 also provides a signal to override the stall control mode during an instrument landing system ("ILS") approach. If the approach is armed, a leading edge detector 194 produces a "1" for input to an AND gate 196. If the approach is armed and the Stall Protect Command is active, an approach latch 198 will produce a "1" at a remaining input of the AND gate 196 and the AND gate 196 will output a "1." The output of the AND gate 196 is input to a reset latch 200 and passed to an AND gate 202. If the glideslope is also captured, a second leading edge detector 204 will provide a "1" to a remaining input of the AND gate 202. Thus, if the glideslope is captured and the approach is armed after the stall protect mode is engaged, the AND gate 202 will output a "1" that will be inverted by an output inverter 206. Consequently, the output of the glideslope capture circuit 168 will be a "0" only when the approach is armed when the Stall Protect Command is active and the glideslope is captured.

Note that the "0" output from the glideslope capture circuit 168 will be transient due to the coupling of the output of the inverter 206 to the latch input of the reset latch 200. When the output of the inverter 206 goes low, the latch input L of the latch 200 goes low. The latch 200 then sets an input of the AND gate 202 low and the output of the glideslope capture circuit 168 will go high. Thus, when the above-described conditions are satisfied (glideslope capture, approach armed and stall protect), a "transient 0" will be supplied to all of the AND gates 166 in the active mode monitor 148, causing the active mode monitor 148 to output a "transient 0." The stall protection system 40 will then automatically exit stall control mode.

While the invention has been described by way of an exemplary embodiment, the claims are not limited to the embodiment described herein. Equivalent devices or steps may be substituted for those described, and operate according to the principles of the present invention and fall within the scope of the claims.

I claim:

1. A method for preventing an aircraft under autopilot control from stalling, the autopilot establishing a set of flight control parameters to seek a selected flight condition of the aircraft, said method comprising the steps of:

selecting a nominal maximum allowable angle of attack for the aircraft;

selecting a trigger angle of attack above the nominal maximum allowable angle of attack;

monitoring an actual angle of attack of the aircraft;

comparing the actual angle of attack to the trigger angle of attack;

if the actual angle of attack of the aircraft exceeds the trigger angle of attack, producing a first stall signal;

supplying the first stall signal to an electronic flight controller; and in response to the first stall signal, overriding the set of flight control parameters with the flight controller by supplying a revised set of flight control parameters to seek a revised flight condition.

2. The method of claim 1, further including the step of selecting a control angle of attack below the trigger angle of attack, wherein the step of supplying the revised set of flight control parameters to seek a revised flight condition includes selecting the parameters in the revised set of flight control parameters to cause the actual angle of attack of the aircraft to approach the control angle of attack.

3. The method of claim 2 wherein the step of selecting a control angle of attack includes the steps of:

monitoring a selected set of flight parameters;

establishing a stick shaker angle of attack in response to the monitored flight parameters; and selecting a safety margin; and subtracting the safety margin from the stick shaker angle of attack to produce the control angle of attack.

4. The method of claim 1, further including the step of:

after overriding the set of flight control parameters, maintaining the revised set of flight control parameters until either the autopilot is disengaged or a new set of flight control parameters is selected by a pilot.

5. The method of claim 1 wherein the step of selecting the trigger angle of attack includes the steps of:

monitoring a selected set of flight parameters;

establishing a stick shaker angle of attack in response to the monitored flight parameters;

establishing a bias angle of attack relative to the stick shaker angle of attack; and adding the bias angle of attack to the stick shaker angle of attack to produce the trigger angle of attack.

6. The method of claim 1 wherein the step of producing a first stall signal includes the step of producing a signal proportional to the difference between the actual angle of attack and the trigger angle of attack.

7. The method of claim 6, further including the steps of:

producing a second stall signal proportional to the difference between the actual angle of attack and the trigger angle of attack; and filtering the second stall signal to produce a filtered stall signal.

8. The method of claim 1, further including the steps of:

producing a transient driving signal; and boosting the first stall signal with the transient driving signal to accelerate response of the autopilot to the first electrical signal.

9. The method of claim 8 wherein the step of boosting the signal proportional to the difference between the actual angle of attack and the trigger angle of attack includes the steps of:

producing the transient driving signal in response to the first stall signal; and adding the transient driving signal to the first stall signal.

10. The method of claim 9 wherein the step of producing the transient driving signal in response to the first stall signal includes the steps of:

monitoring flap angle for the aircraft;

selecting a driving function in response to the monitored flap angle; and applying the driving function to a filter network to produce the transient driving signal.

11. A method for providing an override control signal for an autopilot in an aircraft under autopilot control in response to the autopilot establishing a set of flight control parameters to seek a selected flight condition of the aircraft, where the established set of flight control parameters causes the aircraft to approach a stall condition, comprising the steps of:

selecting a first angle of attack below a stall angle of attack as a nominal maximum angle of attack;

selecting a trigger angle of attack above the first angle of attack;

selecting a second angle of attack below the first angle of attack;

monitoring an actual angle of attack of the aircraft;

comparing the actual angle of attack to the trigger angle of attack; and if the actual angle of attack of the aircraft exceeds the trigger angle of attack, producing an overriding signal to the autopilot corresponding to a revised set of flight control parameters, the revised set of flight control parameters corresponding to the second angle of attack.

12. The method of claim 11 wherein the step of selecting the second angle of attack includes the steps of:

monitoring a selected set of flight parameters, including airspeed;

establishing a stick shaker angle of attack in response to the monitored flight parameters;

selecting a safety margin; and subtracting the safety margin from the stick shaker angle of attack.

13. The method of claim 12 wherein the step of selecting a first angle of attack includes the steps of:

establishing a trigger angle relative to the stick shaker angle of attack; and adding the trigger angle to the stick shaker angle of attack to produce the first angle of attack.

14. The method of claim 11, further including the step of:

after overriding the set of flight control parameters, maintaining the revised set of flight control parameters until either the autopilot is disengaged or a new set of flight control parameters is selected by a pilot.

15. A apparatus for producing a stall override signal in an aircraft having an autopilot, comprising:

a flight angle of attack monitor producing an electrical signal corresponding to a monitored flight angle of attack;

a target signal generator having a control input, the target signal generator producing a target signal corresponding to a target angle of attack equal to a maximum allowable angle of attack in response to a first control signal at the control input and to a reduced allowable angle of attack less than the maximum allowable angle of attack in response to a second control signal at the control input;

an error signal generator having a first input coupled to receive the electrical signal from the flight angle of attack monitor and a second input coupled to receive the target signal from the target signal generator, the error signal generator producing an error signal corresponding to the difference between the target angle of attack and the monitored flight angle of attack in response to the target signal and the electrical signal from the flight angle of attack monitor;

a logic circuit coupled to receive the error signal, the logic circuit having a control output coupled to the control input of the target signal generator, the logic circuit producing the second control signal in response to the error signal indicating that the monitored flight angle of attack exceeds the target angle of attack; and an override signal generator connected to receive the error signal and the second control signal, the override signal generator producing the stall override signal in response to the second control signal and the error signal.

16. The apparatus of claim 15, further including:

a latch circuit having an unlatch input, the latch circuit coupled to maintain the second control signal at the control input of the target signal generator until an unlatch signal is received at the unlatch input.

17. The apparatus of claim 16, further including a mode switch sensor coupled to produce the unlatch signal in response to a user switching autopilot modes, wherein the unlatch input is coupled to the mode switch sensor.

* * * * *